(12) United States Patent
Hanagan

(10) Patent No.: US 6,874,748 B2
(45) Date of Patent: Apr. 5, 2005

(54) ACTIVE FLOOR VIBRATION CONTROL SYSTEM

(75) Inventor: Linda M. Hanagan, State College, PA (US)

(73) Assignee: The Penn State Research Foundation, University Park, PA (US)

(*) Notice: Subject to any disclaimer, the term of this patent is extended or adjusted under 35 U.S.C. 154(b) by 182 days.

(21) Appl. No.: 10/263,583

(22) Filed: Oct. 3, 2002

(65) Prior Publication Data

US 2003/0061767 A1 Apr. 3, 2003

Related U.S. Application Data

(60) Provisional application No. 60/327,056, filed on Oct. 3, 2001.

(51) Int. Cl.[7] .............................. F14M 1/00; E04H 9/00; E04H 9/02
(52) U.S. Cl. ..................... 248/550; 52/167.4; 52/167.6; 52/167.8; 52/167.1; 267/136
(58) Field of Search ............................... 52/167–167.8; 248/550, 560, 561, 575, 636, 638, 562; 188/378–381; 267/136, 140.11, 140.12, 140.14, 140.15

(56) References Cited

U.S. PATENT DOCUMENTS

| | | | | |
|---|---|---|---|---|
| 4,402,483 A | * | 9/1983 | Kurabayashi et al. | 248/636 |
| 5,025,599 A | * | 6/1991 | Ishii et al. | 52/167.2 |
| 5,046,290 A | * | 9/1991 | Ishit et al. | 52/1 |
| 5,065,552 A | | 11/1991 | Kobori et al. | |
| 5,459,383 A | * | 10/1995 | Sidman et al. | 318/611 |
| 5,660,255 A | * | 8/1997 | Schubert et al. | 188/378 |
| 5,823,307 A | * | 10/1998 | Schubert et al. | 188/378 |
| 5,875,589 A | | 3/1999 | Lai et al. | |
| 5,876,012 A | | 3/1999 | Haga et al. | |
| 6,036,162 A | * | 3/2000 | Hayashi | 248/550 |
| 6,053,269 A | | 4/2000 | Patten | |
| 6,193,206 B1 | * | 2/2001 | Yasuda et al. | 248/550 |
| 6,213,444 B1 | | 4/2001 | Yeh | |
| 6,223,483 B1 | | 5/2001 | Tsukagoshi | |
| 6,286,644 B1 | * | 9/2001 | Wakui | 188/378 |
| 6,292,967 B1 | | 9/2001 | Tabatabai et al. | |
| 6,361,483 B1 | * | 3/2002 | Kirchner | 492/16 |
| 6,378,672 B1 | * | 4/2002 | Wakui | 188/378 |
| 6,473,159 B1 | * | 10/2002 | Wakui et al. | 355/53 |
| 6,590,639 B1 | * | 7/2003 | Yuan et al. | 355/75 |

OTHER PUBLICATIONS

Hanagan, et al., "Active Control Approach for Reducing Floor Vibrations," Journal of Structural Engineering, Nov. 1997, pp. 1497–1505.

Hanagan, et al., "Experimental Implementation of Active Control to Reduce Annoying Floor Vibrations," Engineering Journal, Fourth Quarter 1998, pp. 123–127.

* cited by examiner

Primary Examiner—Jeanette E. Chapman
(74) Attorney, Agent, or Firm—McQuaide, Blasko, Schwartz, Fleming & Faulkner, Inc.

(57) ABSTRACT

An active vibration control system for controlling excessive or unwanted vibrations in floors or other structures. The system has three main components: (1) velocity sensor w/signal conditioner; (2) feedback controller; and (3) proof-mass actuator. This system works by creating a feedback loop that generates a control force proportional to the velocity, thus adding damping to the controlled modes of floor vibration. In other words, the feedback loop makes the moving mass of the actuator move to counteract the motion of the floor. The system is optimized such that the motor can be driven with a sinusoidal force where the peak force is at or near the full motor capacity at any frequency without exceeding the stroke while maintaining a simple and cost effective feedback controller. Additionally, a relationship between the fundamental natural frequency of the floor system and actuator is established to provide efficient and stable control.

14 Claims, 1 Drawing Sheet

ACTIVE FLOOR VIBRATION CONTROL SYSTEM

REFERENCE TO PRIOR APPLICATION

This application claims the benefit of prior U.S. Provisional Patent Application 60/327,056 filed Oct. 3, 2001.

FIELD OF THE INVENTION

The present invention relates to the field of vibration damping. More particularly the invention relates to active control systems containing (1) velocity sensor, (2) feedback controller, and (3) proof-mass actuator and their use for damping vibrations of floors and other structures.

BACKGROUND OF THE INVENTION

Excessive or unwanted vibrations are common occurrences. Such vibrations can occur in many places including cars, planes, elevators, and buildings. Controlling unwanted vibrations is a diverse area with many different applications and techniques. One specific area of concern to the present inventor is vibration that may occur in the floors of buildings.

Floor vibrations may be deemed as excessive if they impair the function of the building in some way. At even very small levels, vibration can interfere with the operation of sensitive equipment. When vibrations exist at levels above human perception, they can annoy or even alarm the occupants. In offices and other quiet environments, vibration force levels as low as 0.005 g, where g is the acceleration of gravity, may yield complaints that people can't concentrate. In terms of displacement, motion having peak amplitudes less than 1 mm can be a problem. Where people are sitting or standing in more active or social environments, such as ballrooms, restaurants, and shopping malls, they may object to vibration force levels above 0.02 g. At this level, people find the vibration very noticeable. The motion is not only physically perceptible, other cues that the floor is moving, such as waves in drinks and rattling of objects on tables, become apparent. Above 0.02 g, people may start to question the safety of the structure and refuse to use the space. Even though the structure is perfectly safe at this level of vibration, the perception of danger can still exist, thus impairing the function of the building.

Excessive floor vibrations are usually caused by either equipment or by normal occupant activities. Occupant activities that have a repetitive motion, such as walking, dancing, and jumping, can cause objectionable floor motion due to resonance. Resonance exists when the frequency of the floor disturbances are the same as a natural frequency of the floor system. When resonance occurs, the amplitude of the vibration is largely affected by weight and damping characteristics of the structure. Damping is an effect that causes a dissipation of energy so that resonant vibrations cannot build to large levels. At resonance, decreases in weight and damping result in higher vibration amplitudes given a certain level of disturbance. Such decreases in weight and damping are occurring more often due to recent trends in building construction and use resulting in an increase in the instances of problem floor vibrations.

Modern construction practices are producing buildings that have natural frequencies more prone to resonance, support less weight, and have less damping than buildings of the past. Additionally, many modern offices have fewer partitions, fewer paper files, etc. and therefore fewer non-structural mechanisms for providing damping and weight. In some instances, owners of office buildings in successful service for 30 years are reporting problems that seem to be the result of a change from fully enclosed offices to cubicles. Also, structural materials have become stronger and more lightweight, thus allowing longer spans with less weight. Longer spans tend to vibrate at lower frequencies, thus resulting in natural frequencies more prone to resonance. All of these trends lead to an increased likelihood of problem floor vibrations.

Mitigating problem floor vibrations depends on the source. In the case of equipment-induced floor vibration, the best solution for reducing objectionable vibrations is in isolating the source. Reciprocating or rotating equipment, such as fans and pumps, can be placed on very flexible supports to remove the possibility of resonance with the supporting structure. This type of isolation cannot be accomplished for occupant-induced vibrations caused by activities like walking, dancing and jumping so other modifications to the structure are often necessary to reduce the vibration.

Traditional methods for improving floor vibration characteristics vary widely in cost of implementation, obtrusiveness, and effectiveness. The primary methods known to the inventor for improving floor vibration characteristics are the following: (1) adding columns, (2) adding partitions that span from the floor to the ceiling, (3) adding additional thickness to the flooring, (4) increasing the structural stiffening of the framing members, and (5) adding dampers to the structure.

Adding columns under the problem area will reduce the level of vibrations in that area. While this action is typically very effective, it is not usually a good solution because the columns will disrupt the open space. Additionally, if the columns do not run successively to the ground, they may transmit the vibration to other floors.

Full height partitions (i.e. inside walls) are also an effective way of reducing vibrations. An example of adding full height partitions would be changing an office space from a "cube-farm" type of space to a space with individual fully enclosed offices. Full height partitions are very effective in reducing problem vibrations because they provide both support and damping to the floor system. They can, however, transmit annoying vibrations to other parts of the building and interfere with the building space. Additionally, they can be costly to build, disrupt occupants during installation, and may destroy the original purpose of the building design, for example if the original intent was to have a large open space for a cube-farm.

Adding thickness (e.g. concrete) to the floor slab is also effective in reducing both the amplitude of the vibration and the natural frequency, two desirable effects with respect to human perception. The drawbacks of adding concrete thickness include cost, inadequate strength to support the additional weight, disruption in an occupied building, and the need to modify interior walls, doors and plumbing. Thus, this solution is probably not desirable except in extreme cases.

A related solution is the structural stiffening of framing members. Structural stiffening of framing members is effective in reducing walking vibrations provided the alterations do in fact substantially stiffen the floor structure. Effective stiffening of framing members, however, generally requires ceiling space below the floor structure that may not be available. Accordingly, this solution has limited applicability and also suffers from the cost and disruption of building occupants.

Perhaps the least intrusive of the traditional methods for reducing problem vibrations is the use of tuned mass dampers (TMD). TMDs are made of a weight hung from a spring attached to the vibrating structure. A damping element also connects the mass to the structure thus providing a mechanism to dissipate energy. They are "tuned" to the natural frequency of the floor system so that they are most effective in damping the expected frequency of the problem vibrations. Tuned mass dampers reduce resonant vibration amplitudes and reduce the duration of transient vibrations without a considerable change in the natural frequency of the problem vibrations. The effectiveness of a tuned mass damper is limited by the amount of additional mass that can be safely supported by the structure. Additionally, the mechanisms that provide the damping are often ineffective for very small amplitudes, thus rendering the device ineffective for all but the worst problem floors.

A more recently developed solution for the problem of unwanted floor and other structural vibrations and an area that is recognized as having significant potential for improved vibration control is known as "active vibration control". In the context of vibration control, the term active control refers to a mechanism that uses energy from an external source to reduce vibration. Active control technology has been used in many disciplines to improve the response of dynamic systems but has had limited impact in the case of floor systems. Active control has a large advantage over passive damping techniques (e.g. tuned mass damper mentioned above). The primary advantage is that active control requires much less moving mass to effect the same degree of control. The primary disadvantage is the increase in complexity and cost of implementing and maintaining the control system.

One such prior art active control system developed by the inventor hereof is described in *Engineering Journal*, 4$^{th}$ Quarter, 1998, pp 123–127 and *Journal of Structural Engineering*, November 1997, pp 1497–1505 (both hereby incorporated by reference). This system uses an off the shelf actuator, velocity sensor and a PC computer based digital controller. Several disadvantages of this system are that the properties of the actuator are not optimized for maximum control effectiveness and a computer-based control loop is not very practical for actual implementation.

Additionally, some US Patents have addressed the issue of problem vibrations with a variety of passive and active control solutions. For example:

U.S. Pat. No. 6,053,269 to Patten discloses a vibration mitigation assembly for mitigating vibration of a bridge as a vehicle travels across the bridge. The system contains sensors, a controller, and multiple actuators. The actuators are hydraulic actuators and do not use a proof-mass.

U.S. Pat. No. 5,065,552 to Kobori et al. teaches an active vibration control system for adding variable damping to the frame of a structure (e.g. a building). The variable damping device includes a sensing means, a feedback control means, and a variable stiffness means. The system does not use a proof-mass actuator and is generally directed toward responding to earthquakes.

U.S. Pat. No. 5,875,589 to Lai et al. describes a method for damping floor vibrations in structures. The method comprises the attachment at multiple points on the floor of a specific type of passive vibration damping device. The device comprises an inner layer of viscoelastic material sandwiched by outer rigid layers. This approach has the significant disadvantage of requiring multiple connections to the structure and the space for the device to hang.

U.S. Pat. No. 6,223,483 to Tsukagoshi discloses a vibration damping mechanism for providing a building or other structure. The mechanism is a passive system with pivoting plates connected to the structure frame and to a viscoelastic body capable of absorbing the vibration energy.

U.S. Pat. No. 5,876,012 to Haga et al. teaches a compact vibration cancellation apparatus. The device uses various sensors, a control system, and a combination of air springs and electromagnetic actuators. The apparatus is designed to cancel the vibration of a piece of equipment and prevent it from being transferred to a floor system.

U.S. Pat. No. 6,292,967 to Tabatabai et al. discloses a tuned mass damper (TMD) design for wind-rain induced vibrations of a cable-stayed bridge. The TMD is mounted on a stay cable and comprises a viscoelastic spring system inside a cylindrical housing.

U.S. Pat. No. 6,213,444 to Yeh describes a passive vibration damper that is placed between a machine and a floor. The vibration damper has an I-shaped girder structure and includes a layer of cement and a layer of vibration absorber. The device is particularly designed for damping between a semiconductor manufacturing machine and a floor.

The prior art literature and patents describe a variety of methods for remediating excessive vibrations. However, the drawbacks to the traditional structural and passive solutions and the limited commercial success of the new active control systems illustrate the need for alternatives or improvements in controlling excessive floor vibrations. These are the primary needs addressed by the present invention. Accordingly, the following are selected objects of the present invention:

It is an object of the invention to improve the effectiveness of vibration control systems used for reducing vibrations in floors and other structures.

It is also an object of the present invention utilize a simple and therefore practical feedback controller.

It is also an object of the present invention to produce an active control system that is optimized to more effectively use the force and stroke capacity of the motor than prior art solutions while maintaining a simple feedback controller.

SUMMARY OF THE INVENTION

The invention is an active floor vibration control system having three main system components: (1) velocity or acceleration sensor; (2) feedback controller; and (3) proof-mass actuator. This system works by creating a feedback loop that generates a control force proportional to the velocity, thus adding damping to the controlled modes of floor vibration. In other words, the feedback loop makes the moving mass of the actuator move to counteract the motion of the floor. The system is optimized such that the motor can be driven with a sinusoidal force where the peak force is at or near the full motor capacity at any frequency without exceeding the stroke.

DETAILED DESCRIPTION OF THE INVENTION

Figure 1:
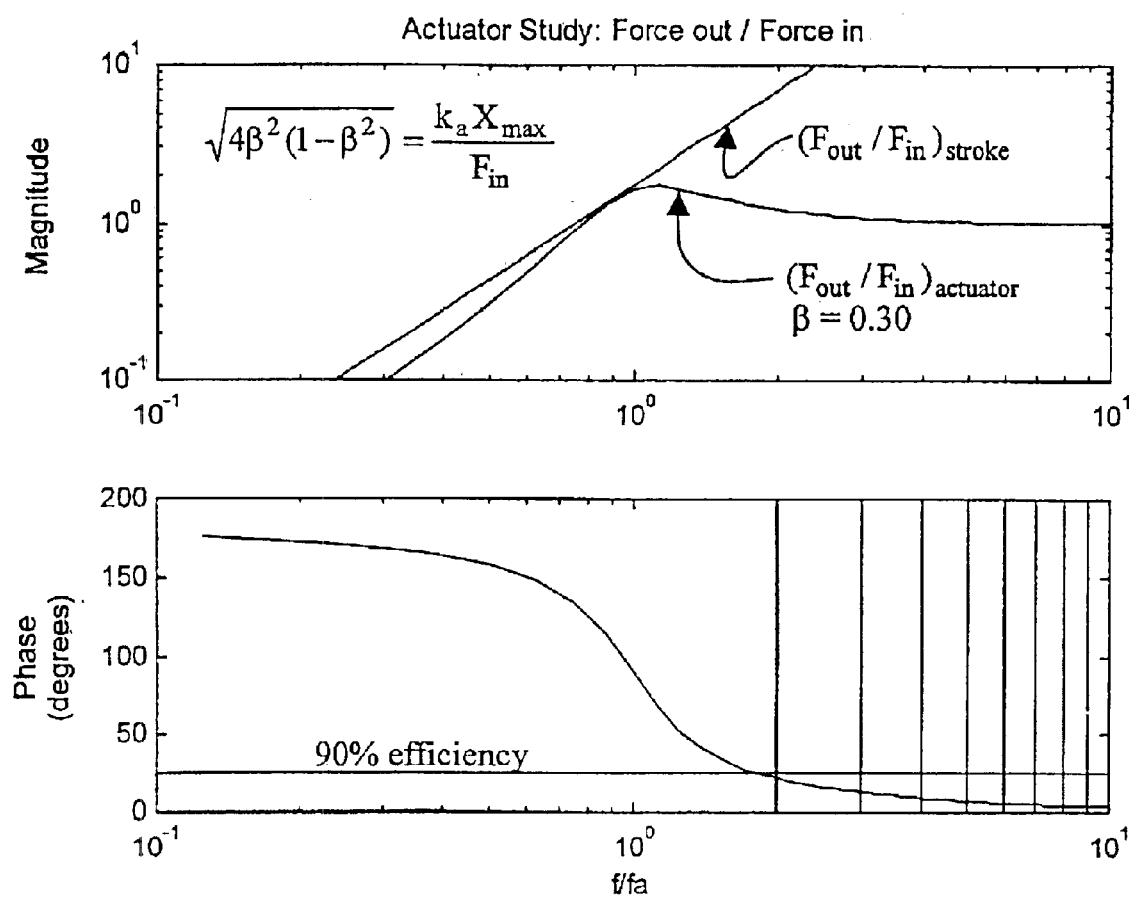
FIG. 1 shows an example of the optimized proof mass actuator behavior of the present invention. The horizontal axis is the dimensionless quantity of the sinusoidal driving frequency and the natural frequency of the actuator.

Active control in this invention is implemented using a proof-mass actuator, a velocity sensor and a feedback loop to generate the control forces to add active damping to a floor system or other structure that exhibits excessive or unwanted vibrations. The core of the invention is not the combination of the three components, but in the inventor's discovery of the optimum interaction of the components to significantly increase the control efficiency above prior art methods. The improved performance is based on the design of each of the components that make it possible to collectively work as an effective and efficient control system for floor systems.

Each component of the active damping system will now be discussed in more detail:

Velocity Sensor: The first component of the system is a velocity or similar sensor that can sense vibration amplitude (velocity). The sensor needs to be capable of generating a time dependant voltage that is proportional to, and in phase with, the velocity of the floor motion at or near the location of the actuator. A few choices exist commercially. One example is an accelerometer-based sensor with an integration circuit. Another possible commercially available choice is a seismometer, which is basically a moving mass inside of an induction coil.

The primary challenge in selecting or building this component for use on a low frequency floor is finding a sensor with a small enough lower limit on the bandwidth. Because significant phase distortions can exist at the lower limit of the sensor bandwidth, the lower limit on the bandwidth must be somewhat lower than the lowest floor natural frequency present at the measurement location. The effect of phase distortion from the sensor is reduced efficiency and possibly instability in the controlled system. Typically, the velocity sensor should have a lower limit on the bandwidth that is less than about half of the first natural frequency of the floor system being controlled. A majority of problem floors have fundamental natural frequencies above 4 Hz. The exceptions are generally long span floors, beam or girder spans greater than 60 ft, with fundamental natural frequencies even below 2 Hz. Frequencies as low as about 1.5 Hz have been observed by the inventor. Velocity sensors having a lower limit of bandwidth of about 1.5–2.5 Hz or even as low as 1 or 0.75 Hz can be used in the invention. However, the specific sensor chosen will depend highly on the specifics of the problem floor and the dynamics of the specific sensor chosen. In general, the sensor dynamics should be such that the phase of the action produced is not significantly distorted by the sensor. Currently, the lower limit of bandwidth for commercially available velocity sensors is about 1.5–2.5 Hz. With these sensors, floors with natural frequencies below 3 Hz may not be effectively controlled using the floor vibration control system.

Feedback Controller: The velocity sensor produces a time dependant voltage signal that is proportional to, and in phase with, the velocity of the floor motion at or near the location of the actuator. This signal is then sent to the second component of the system, which is a feedback controller. The feedback controller takes the output of the sensor and produces the appropriate control signal for the actuator. The feedback controller can be analog or digital; however, since the control algorithm is so simple, an analog device is more practical. One condition of utilizing a simple controller is that the actuator properties must be given careful consideration as noted in the actuator section below.

The most basic form of the controller includes three main components. The first is a component that corrects any DC offset that may be present in the sensor output voltage. This offset is common in the "integrated accelerometer" type of sensor described above. However, if a velocity sensor is used that does not have a DC offset then this component is not needed. The second component of the controller is the signal amplification (gain) circuit. The amount of amplification should be variable so that it can be optimized to achieve the greatest degree of control on a specific floor structure. The optimal gain is dependent on the properties of the proof-mass actuator, the velocity sensor, and the floor system to be controlled. Through experience, it has been determined that the optimal gain is around half the gain which causes unstable behavior in the controlled system as described in the *Journal of Structural Engineering*, November 1997, pp 1497–1505. The third component of the controller is a clipping circuit. The clipping circuit limits the maximum voltage delivered to the actuator and protects the actuator from being overdriven Proof-Mass Actuator: The control signal produced by the feedback controller is then sent to a proof-mass actuator. The control signal will cause a motor to move or actuate a mass that will counteract or dampen the sensed vibrations. A properly configured proof-mass actuator is the greatest challenge to the success of this system. The proof-mass actuator has four main sub-components whose property selections are highly interdependent and have a great effect on the performance of the system.

The first sub-component is a linear motor to move the proof-mass. The important factors in selecting a linear motor are maximum stroke and maximum force. Selection of the maximum force depends on the level of force causing the vibration and the level of reduction required. Selection of the maximum stroke depends on several factors to be elaborated upon later. Additionally, one must be concerned with behavior at low force levels (there can be some "sticking" at low force levels) and that the force output is proportional to and in phase with the drive signal at frequencies between zero and 20 Hz. Some phase and amplitude distortion is acceptable, especially at higher frequencies.

The second sub-component is a moving mass. The actual weight of the moving mass is an interdependent property discussed more fully below. Any material can be used; however, compactness of the device is best achieved using a more dense material, such as steel or lead. The mass must be positioned in the device in such a way that it can be actuated by the linear motor, but no one specific arrangement is required by the present invention as long as the critical parameters described herein are maintained by the system.

The third component is one or more linear springs. The springs will support the moving mass. The critical parameters in selecting the springs are the linear spring stiffness, the maximum load capacity, and/or the maximum displacement capacity. The maximum load capacity of the springs should be at least the sum of the maximum control force out and the weight of the suspended mass. The maximum displacement capacity of the springs should be at least the sum of the displacement due to suspended mass and the maximum stroke of the linear motor. The linear spring will not typically be literally a metal spring, but can be any device providing the properties expected of a linear spring as will be known to those of skill in the art. For example, elastic bands and air bags can provide such properties.

The fourth component is a damping mechanism. The critical parameters in selecting the damping mechanism are the linear damping constant and the stroke limit of the damper. The stroke limit of the damper should be at least as much as the maximum stroke of the linear motor. Careful attention must also be given to extracting the heat generated by the dissipation of energy by the dampers. Sufficient damping can be inherent in other components of the system itself or additional damping can be added. Supplemental damping can be provided by devices such as viscous or air dashpots. Viscoelastic materials can also be used to supplement both damping and stiffness. The critical feature in regards to damping is that the damping parameters mentioned above and discussed more fully below are met.

There are two types of interaction that must be carefully considered to assure maximum efficiency and stability of the controlled system.

First, there is an important interaction between the stroke limitations of the device and the dynamic properties of the device. To use the simple controller specified above, the properties of the actuator must be configured such that the motor can be driven with a sinusoidal force (or an approximately sinusoidal such as a clipped sinusoidal force), where the peak force is at or near the limit set in the clipping circuit of the controller, at any frequency without exceeding the stroke. To accomplish this goal, the following relationship has been derived (Equation 1):

$$\frac{1}{\sqrt{4\beta^2(1-\beta^2)}} \leq \frac{k_a X_{max}}{F_{inmax}}$$

where $\beta$=damping ratio for the actuator (linear damping constant/critical damping); $k_a$=linear spring stiffness; $X_{max}$=maximum stroke of the actuator (half of the total stroke of the actuator); $F_{inmax}$=force limit set by the clipping circuit in the controller.

This relationship, when equal, is at the lowest frequency where the [mag $(F_{out}/F_{in})_{stroke}$] intersects the [mag $(F_{out}/F_{in})_{actuator}$] where $F_{out}$ is the force exerted on the structure as a result of the inertial effect of the moving actuator mass. This relationship is illustrated in FIG. 1. Increasing $k_a$ and $X_{max}$ has the effect of moving the [mag $(F_{out}/F_{in})_{stroke}$] line to the left. Decreasing $F_{inmax}$ has the same effect. If the inequality above is not satisfied, the [mag $(F_{out}/F_{in})_{stroke}$] line moves to the right; thus, creating the potential to exceed the stroke limit of the actuator.

To operate the system at peak efficiency, $F_{inmax}$ should be as close to the full motor capacity, that at which the motor can be driven continuously without damage, as possible without defying the inequality above. This inequality ensures that, even at an unstable gain, the stroke limits of the system are not exceeded, thus, protecting the device from damage. In sacrificing some efficiency $F_{inmax}$ could be set at less than full motor capacity. For example it could be set at 80% or more of this amount or preferably greater than 90%. However, most preferably it is set very near the full motor capacity to achieve maximum efficiency. Additionally, it could be said that some risk could be taken in defying this inequality, but a more in depth evaluation would be necessary to prevent damage.

Second, there is an important relationship between the actuator properties and the floor system properties. For the control system to work efficiently, the natural frequency of the proof-mass actuator must be less than half of the first natural frequency of the floor system. This guideline has the condition that the proof-mass actuator damping is less than 40% of critical. Critical damping is defined as $2\sqrt{km}$ where k is the spring constant for the actuator spring and m is the moving mass of the proof mass actuator. The reason for this guideline is to make sure that the control system is operating with very little phase distortion between the force in, created by the motor, and the force out, created by the moving mass. The effect of phase distortion between the force in and the force out can be one of reduced efficiency and possibly instability. FIG. 1 illustrates the phase distortion caused by the actuator properties where zero degrees would represent no phase distortion. The horizontal line on the phase plot crosses at 25.8 degrees and at a f/fa ratio of 1.8. This represents a 10% loss in efficiency. In one embodiment of the invention an acceptable loss of efficiency occurs with a phase distortion of less than about 30 degrees.

It is also notable that if the floor being controlled has a natural frequency greater than 2× the natural frequency of the actuator, then damping in the proof-mass actuator can be increased above 40% without reducing efficiency due to phase distortions. Also note that when the first natural frequency of the floor is below the natural frequency of the actuator, this system will produce a destabilizing effect (i.e. make the floor worse). Thus, in the present invention, we prefer that the actuator damping be between 30% and 40% to satisfy the objectives given above while maintaining a versatile system with respect to what floors it will be effective in controlling.

Also, the efficiency of the actuator in the control loop can be evaluated from the following relationship: Efficiency=cos [phase angle] where the phase angle is evaluated for the ($F_{out}/F_{in}$) actuator function at the actual value of f/$f_a$ for the floor system being controlled. When this expression yields a negative result, the control force will be destabilizing. It is desirable to have the efficiency of the actuator at about 80% or more, preferably above about 90%.

While the invention has been particularly shown and described with reference to preferred embodiments thereof, it will be understood by those skilled in the art that various alterations in form and detail may be made therein without departing from the spirit and scope of the invention. For example, the following two modifications are possible:

(1) a linear voltage displacement transducer (LVDT) can be added to the system to electronically control the stiffness characteristics of the proof-mass actuator.

(2) an element sensing the relative velocity of the moving mass can be added to the system to electronically control the damping characteristics of the proof-mass actuator. The possibilities for sensing relative velocity are broader than those suggested previously for absolute velocity (e.g. non-contact laser devices). Phase distortions at low frequencies must be carefully considered as noted previously.

I claim:

1. An active vibration control system for damping vibrations of a floor system or other structure, said system comprising:

a) a sensor capable of producing an output proportional to vibration velocity;

b) a feedback controller; and c) a proof-mass actuator comprising a linear motor, a moving mass, a linear spring, and a damping mechanism;

wherein the properties of the actuator and feedback controller are predetermined such that the system operates without possibility of damage to the system components by exceeding the stroke limitation of the motor or other components; and wherein the following relationship holds:

$$\frac{1}{-\sqrt{4\beta^2(1-\beta^2)}} \leq \frac{k_a X_{max}}{F_{inmax}}$$

where $\beta$=damping ratio for the actuator (linear damping constant/critical damping); $k_a$=linear spring stiffness;

$X_{max}$=maximum stroke of the actuator (half of the total stroke of the actuator); and $F_{inmax}$=force limit set by the clipping circuit in the controller.

2. The active vibration control system of claim 1 wherein the feedback controller contains a clipping circuit and wherein the force limit set by the clipping circuit is at or near full motor capacity.

3. The system of claim 1 wherein $F_{inmax}$ is at or near full motor capacity.

4. The system of claim 1 wherein the relationship is approximately equal.

5. The system of claim 1 wherein the feedback controller is a controller comprising a signal amplification circuit and a clipping circuit.

6. The system of claim 5 wherein the feedback controller additionally comprises a dc offset correcting circuit.

7. The system of claim 5 wherein the signal amplification is set at around half the amount which would cause unstable behavior in the system.

8. The system of claim 1 wherein the velocity sensor has a lower bandwidth limit such that significant phase distortions are not present at the first natural frequency of the structure to be damped.

9. The system of claim 8 wherein the velocity sensor has a lower bandwidth limit that is less than about ½ of the first natural frequency of the structure to be damped.

10. The system of claim 1 wherein the phase distortion between $F_{in}$ and $F_{out}$ is less than 30 degrees.

11. The system of claim 10 wherein the natural frequency of the proof-mass actuator is less than half of the first natural frequency of the floor system when the proof-mass actuator damping is less than 40%.

12. The system of claim 1 wherein the actuator damping is between 30 to 40%.

13. The system of claim 12 wherein the actuator damping is near 40%.

14. The system of claim 1 wherein the actuator additionally contains a linear voltage displacement transducer to electronically control the stiffness characteristics of the proof-mass actuator.

* * * * *